March 18, 1941.  J. C. PATRICK  2,235,621
RUBBER COMPOSITION
Filed March 17, 1938
A 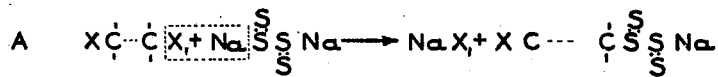
B 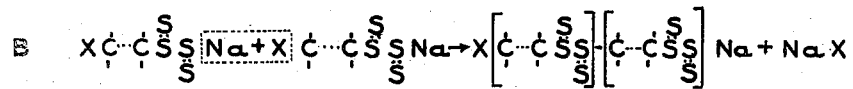
C 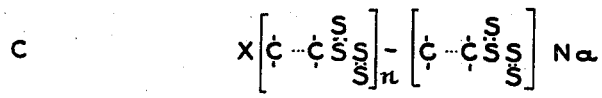
D 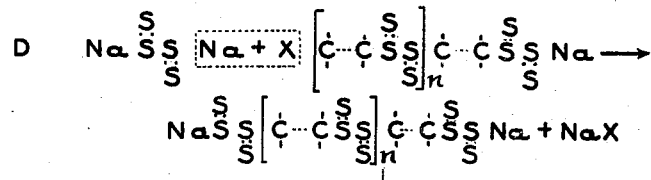
+ 2 H$_2$O
E 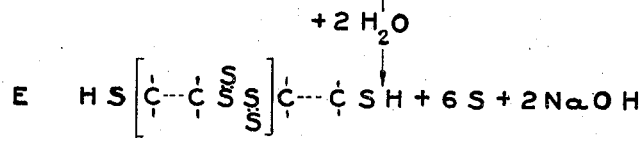
F 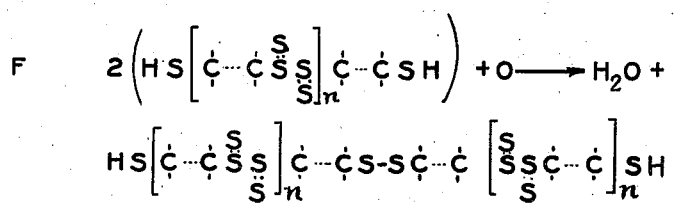
Inventor.
Joseph C. Patrick
By Efford Sauer Burgess
Attorneys Patented Mar. 18, 1941

2,235,621

UNITED STATES PATENT OFFICE 2,235,621

RUBBER COMPOSITION

Joseph C. Patrick, Morrisville, Pa., assignor to Thiokol Corporation, Yardville, N. J., a corporation of Delaware Application March 17, 1938, Serial No. 196,376

3 Claims. (Cl. 260—3)

This invention relates to a reaction whereby natural rubber and various varieties of synthetic rubbers may be vulcanized or cured by the use of a chemical compound containing sulfur as one of its substituents. For many years, in fact ever since the discovery of vulcanization by Goodyear, elementary sulfur has been widely employed as a vulcanizing agent for rubber and, while of the greatest utility in this process, the use of sulfur as a vulcanizing agent is attended with certain very definite disadvantages. For example, numerous rubber articles, e. g. footwear and pneumatic tires develop, after manufacture, a deleterious effect known as "blooming," which greatly impairs the value of such articles.

Other instances in which the blooming of sulfur is of great disadvantage is in the process of retreading used tires. For this purpose, rubber manufacturers sell a vulcanizable composition of sulfur and rubber to repairmen. This is sold in the form of sheets or strips. The process of retreading includes the step of superimposing a strip of a vulcanizable rubber composition on the tread portion of an old tire and forming a union between the two under heat and pressure. The vulcanizable retreading stock is frequently stored in the repairman's shop for a long period, and when sulfur is the vulcanizing agent, such stock develops the disadvantages of the blooming effect already mentioned. The effect of this blooming is serious because it tends to prevent a proper union between the surface of retreading stock and the surface of the old tire.

Another disadvantage of sulfur as a vulcanizing agent is that the valuable properties produced by vulcanization, such as tensile strength, elongation, etc. are subject to reversion, i. e. there is an optimum period of cure and if this period is exceeded, there is a marked deterioration.

Still another disadvantage of sulfur is the fact that an excess of sulfur is required over and above that which actually combines with the rubber. The presence of this excess gives the rubber composition poor aging properties and much effort has been expended in endeavoring to stabilize the vulcanized composition such as by the addition of antioxidants.

It is an object of this invention to provide a rubber composition free from the phenomenon of blooming.

Another object is to provide such a composition substantially free from free sulfur.

Another object is to obtain a rubber composition having improved physical properties.

Another object is to provide a rubber composition the properties of which are stable upon aging.

Another object is to provide a rubber composition which is not subject to the phenomenon of reversion.

Another object is to provide a rubber composition in which a predetermined rate of vulcanization can be obtained independently of the extent or coefficient of vulcanization.

Other objects and advantages will appear hereinafter.

The advance in the art represented by the invention will be defined by the claims ultimately appended hereto. Of the numerous forms in which the invention thus defined may be embodied, a considerable number will be described herein for purposes of illustration.

In accordance with this invention, certain classes of organic polysulfide polymers are employed as described and claimed.

The structure of these polymers may be described generally by stating that they are characterized, in part, by an organic radical selected from certain groups of organic compounds, alternating with a group of sulfur atoms, and the general formula of such polysulfide polymers may be written as follows:

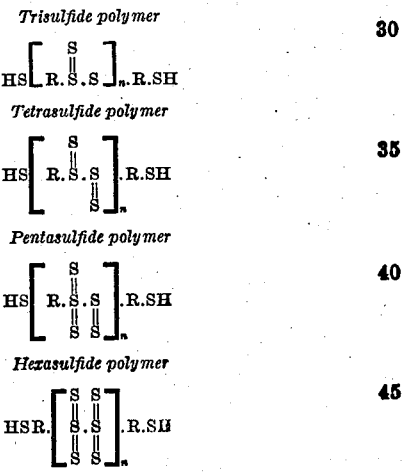

As is more fully hereinafter explained, the pair of sulfur atoms separating the radicals R in the above formulae are in stable chemical combination and form the linkage between the said radicals, whereas the remaining sulfur atoms joined to the said pair are in a labile condition and it is this labile condition which enables those particular sulfur atoms to function as the active vulcanizing agent.

The unit of the said polymers is R—S$_n$ where S is a sulfur atom, $n$ is 3 to 6 and R is a radical having certain characteristics.

In order to realize the benefits of this invention this radical R should have a pair of non-adjacent carbon atoms separated by and joined to intervening structure selected from the group consisting of (a) Ether linkages
(b) Unsaturated hydrocarbons
(c) Aryl groups or aromatic structure
(d) Saturated hydrocarbons The intervening structure is not however limited to members of the groups set forth and may include other structure, e. g. ketone structure.

The said polymers may be formed by different means, all of which substantiate the constitution of said polymers as shown above. For example, a suitable polymer may be formed by a reaction between an alkaline polysulfide, e. g. sodium, potassium, ammonium, lithium, etc. polysulfide, on the one hand, and on the other hand an organic compound containing a substituent on each of two different carbon atoms where those carbon atoms are joined to and separated by intervening structure as above set forth, which substituent is split off during the reaction. In other words, there is a pair of carbon atoms to which are joined, respectively, a substituent capable of being split off by reaction with an alkaline polysulfide. The space between the carbon atoms is opened up and intervening structure is placed in that space. Each carbon atom is joined, on the one hand to a substituent capable of being split off by an alkaline polysulfide and on the other hand to structure intervening between the said pair of carbon atoms.

In the polysulfide reaction the molecules of the organic substance become joined together to form a complex pattern or chain, i. e. the relatively small molecules of the organic substance are joined together to form a very large molecule or polymer. This joinder takes place through the medium of the sulfur in the polysulfide. This sulfur acts as a sort of bridge from one molecule to the next. As a result, the reaction products have high percentages of sulfur. They also have colloidal properties.

The mechanism of the polysulfide reaction will now be explained, reference being had to the accompanying diagram.

Reaction A occurs because the Na (sodium) unites with the X' atom or radical, i. e. splits off the said X' atom or radical from the compound

This causes the group

to take the place of X' and a new compound is formed as shown in Equation A. This reaction may be classified in chemistry as a saponification reaction.

In reactions A and B above, X and X' are respectively any saponifiable acidic substituent, i. e. substituents which can be split off by treatment with an alkaline substance, e. g. halogen, sulfate, nitrate, phosphate, carbonate, formate, acetate, propionate, laurate, oleate, stearate, oxalate, malonate, tartrate, citrate, etc.

As a result of reaction A, a molecule is produced having a saponifiable substituent attached to one carbon atom, and a sodium polysulfide radical

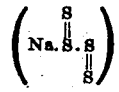

atom attached to another carbon atom.

Owing to the capacity of the sodium to unite with the saponifiable acidic substituent, the compound produced in Equation A has the remarkable ability of uniting with itself, as shown in Equation B.

Moreover, the compound produced as shown in Equation B unites with itself in the same manner and this continues until the size of the molecule is so large that its sluggishness prevents further condensation or self-union.

This ability requires the existence of a sodium polysulfide radical (or its equivalent) on one carbon atom and a saponifiable acidic substituent on another carbon atom of the same compound.

If this rule is observed, union of the compound containing said pair of carbon atoms to form a compound containing a tetrad or quartet of carbon atoms does not exhaust the reaction because each terminal carbon atom of this quartet will also have attached thereto, respectively, a saponifiable substituent and a sodium polysulfide radical, so that the quartet or tetrad can form an octad.

This permits a building up of a carbon chain in geometrical progression starting with a compound containing (but not necessarily consisting of) two carbon atoms.

The radical R previously referred to is the radical

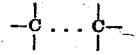

set forth in the accompanying diagram at A through F and to realize the benefits of this invention, the two carbon atoms in that radical should be separated by and joined to intervening structure selected from the group consisting of (a) Ether linkages
(b) Unsaturated hydrocarbons
(c) Aryl groups or aromatic structure
(d) Saturated hydrocarbons as previously mentioned.

These two carbon atoms are respectively attached to substituents which are split off in the reaction as will be explained.

The unit of the chain is the said pair of carbon atoms, separated by and attached to said intervening structure, plus a group of sulfur atoms thus:

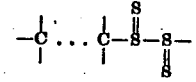

where the group of sulfur atoms is the tetrasulfide group. This group may be the disulfide group —S—S—, the trisulfide group

the tetrasulfide group shown, the pentasulfide group

or the hexasulfide group

depending upon whether an alkaline disulfide, trisulfide, tetrasulfide, pentasulfide or hexasulfide is used. With this explanation the reaction can be regarded from the mechanical point of view and it is clearest when so regarded. The said unit can be likened to a unit building block with at least two interlocking members on each unit. For example, one of these members may have a male thread and the other a female thread. The male member on one unit can then engage the female member on another unit, so as to build up a chain or complex structure analogous to the polymer of this invention. There must be at least two of such interlocking members on each unit. Otherwise the length of the chain is limited to a union of two elements.

Referring now to the diagram, the compound shown as produced in reaction B continues to unite with itself until a long chain is built up having the formula shown at C. This then loses its X terminal and acquires SH terminals at each end by hydrolysis, as shown in Equations D and E. At this stage the condensing or polymerizing action of the polysulfide substantially ceases.

It is desirable to carry out the above reaction in an alkaline dispersion medium as specifically illustrated in Example 1 below, and to produce the polymer at the above mentioned stage in the form of a latex-like liquid from which the polymer may be separated by various means, e. g. coagulation produced by the addition of acid. This latex has the property of mixing intimately with water without dissolving therein and may therefore be washed thoroughly to remove soluble impurities.

Notwithstanding the large size of the molecule produced as indicated at E, further increase in size may be caused by employing oxidation, preferably while the product is still in the dispersed form and prior to the curing step, i. e. while the polymer is still in the intermediate stage. This may be done by blowing air through the dispersion, provided it is definitely alkaline, or by employing any of a number of oxidizing agents effective under alkaline conditions, such as hydrogen peroxide, benzoyl peroxide, sodium, potassium, barium and calcium peroxides, perborates, permanganates, chromates and dichromates, etc.

When oxidized the polymer shown at E condenses as indicated by Equation F in the diagram.

Alkaline polysulfides are themselves oxidizing agents provided an excess be employed over the equimolecular proportions shown in Equations A to E inclusive.

It is generally desirable to increase the size of the molecule as much as possible in the intermediate stage.

Proof that the reaction occurs by the mechanism shown and that the products obtained have the formulae shown include the following:

(a) Taking BB' dichlorinated ethyl ether as an example, the chlorine of the compound appears quantitatively in the form of sodium chloride as a by-product.

(b) After isolating the polymer from the soluble by-products the weight of the polymer is quantitatively equal to the weight of the dichlorinated ether minus the halogen plus the sulfur from the alkaline polysulfide.

(c) The proportion of sulfur in the polymer is equal to that in the following formula:

[C₂H₄.O.C₂H₄.S₄]

(d) Attempts to determine molecular weight of the polymer shows that it is very high. This is substantiated by the properties as herein described.

(e) A polymer having properties identical with those obtained by reacting dihalogenated ethyl ether with sodium tetrasulfide, can be obtained by an entirely different route, as shown by the following equations:

(1)     2(HS.R.SH) +O=HS.R.S.S.R.SH where R=—C₂H₄.O.C₂H₄—

The above dimercapto ether is obtained by reacting BB' dichlorethyl ether with sodium hydrosulfide NaSH.

(2)     2(HS.R.S.S.R.SH) +O=
                    HS.R.S.S.R.S.S.R.S.S.R.SH

This continues until a polymer is built up having the formula (3)           HS.(RSS)ₙR.SH This on further oxidation gives (4)     HS.(RSS)ₙR.S.S.R(RSS)ₙHS The above compound (4) reacts with sulfur to produce a product identical with that shown in Equation F in the diagram, and conversely the product shown in Equation F can be partially desulfurized to produce a product identical with that shown at (4) above.

The above mercaptan reaction shows that the linkage between the organic carbon radical is through a sulfur bridge.

(f) X-ray examination shows that the distance between the carbon radicals is equal to the sum of the diameters of two sulfur atoms.

The two sulfur atoms referred to are bound firmly and form the direct bridge between the carbon radicals whereas the remaining sulfur atoms are in labile form and may be removed by a partial desulfurizing action as already mentioned.

In the formula shown in Equation F, the value of n is so great that the product is substantially and practically a polymer of the unit

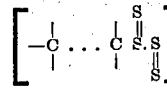

and the product reacts as such. For example, three mols of this unit react with two mols of sodium sulfide according to the following equation:

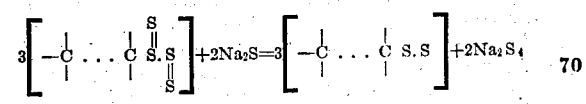

and the resulting product is identical in all its properties with the product produced by oxidation of a polyfunctional mercaptan as shown in Equations 1 to 4 above.

Conversely, the polymer shown in Equation 4 above as produced by oxidation of a polyfunctional mercaptan behaves substantially as a polymer of the unit

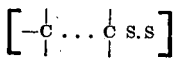

A mol of this unit will react with two atoms of sulfur as follows:

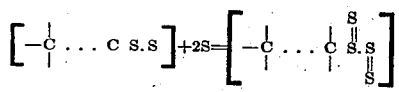

and the product obtained is identical in all its properties with that shown in Equation F in the diagram.

This is further proof that the organic radicals in the polymer, i. e., the carbon radicals, are joined together through a bridge of two sulfur atoms. This bridge is in firm chemical combination, whereas the remaining sulfur atoms in the polysulfide polymer are in labile condition and may be removed by partial desulfurizing agents, such as alkaline monosulfides, alkalies including NaOH and KOH and sulfites.

In the above equations, instead of the tetra sulfides, the tri, penta and hexa sulfides similarly react.

This invention utilizes the lability of said labile sulfur atoms in conjunction with the special structure of the polymers. In accordance with this invention, a vulcanizable natural or synthetic rubber is intimately mixed with a polymer of the unit $$\left[-\underset{|}{\overset{|}{C}} \ldots \underset{|}{\overset{|}{C}}-S_n\right]$$

where $$\underset{|}{\overset{|}{C}} \ldots \underset{|}{\overset{|}{C}}$$

represents two carbon atoms joined to and separated by structure selected from the group consisting of ether linkages, unsaturated carbon atoms, aryl groups and saturated hydrocarbons, S is a sulfur atom and $n$ is an integer of 3 to 6.

Upon heating, reaction occurs between the rubber and the polymer and as a result of this reaction a novel composition is obtained having certain highly desirable properties as hereinafter more fully set forth. Although the vulcanization of the rubber by the labile sulfur of the polymer is one of the features of the reaction, it is not limited to this because the polymer as a whole also reacts and confers upon the resulting composition said desirable properties.

The invention will be further described in reference to the following specific examples, which will be submitted for purposes of illustration rather than limitation.

EXAMPLE I

Production of polysulfide polymer by reaction between an alkaline polysulfide and an organic compound having a saponifiable acidic substituent attached to each of two different carbon atoms where those carbons are separated by an ether linkage.

Into a closed reaction tank suitably equipped with stirring means, pipe coils for steam and cold water and a thermometer are placed 2,000 liters of 3-molar sodium tetrasulfide solution. To the polysulfide solution are added, with vigorous agitation, 10 kilograms of caustic soda dissolved in 15 liters of water. This is followed by the addition of 25 kilograms of crystallized magnesium chloride ($MgCl_2.6H_2O$) dissolved in 20 liters of water.

The polysulfide mix is heated to about 135° F. and about 700 kilograms of BB′ dichloroethyl ether are added gradually over a period of about three hours. The rate of addition of the dichloroether is so regulated as to prevent the temperature of the reaction from going above about 210° F. during the reaction.

When all the chloroether has gone into the reaction and the temperature shows a tendency to drop, steam may be admitted to the heating coils and so regulated as to maintain a temperature of from 215° to 220° F. for about three hours during which time the latex-like dispersion of the polymer is constantly stirred or agitated. The heating step just described is carried out in order that the excess of polysulfide over that actually required to decompose the dichloroether may exert a condensing or polymerizing effect on the reaction product as first formed.

The finely divided latex-like dispersion of the polymer may now be freed from water-soluble impurities by any suitable means such as filtration and repeated washing with fresh water, or it may be washed by repeated settling of the particles, removal of supernatant liquid followed by re-suspension in clean water and the settling process repeated.

The washed latex-like dispersion may now be used in the dispersed form or it may be separated from excess water by filtration and drying to give an elastic mass; or it may be treated with sufficient dilute acid, for example dilute hydrochloric, sulfuric or acetic acid, to confer a slight acidity on the latex dispersion in which case coagulation occurs.

The coagulum can be freed from adherent and occluded water by mastication or kneading on rolls or by prolonged drying or by subjecting to pressure.

It will be noted that in the above example six kilogram mols of the polysulfide were used whereas only about five kilogram mols of the organic reactant were used leaving about 20 molar percent excess of the polysulfide. This procedure provides an excess of polysulfide over that required for saponification of the organic compound used and that excess is then immediately available for the second step which results in further polymerization of the product due to the oxidizing effect of the polysulfide on the finely divided reaction product during the prolonged heating period.

Equimolecular proportions of the organic reactant could obviously be used with the polysulfide and after the saponification is complete an additional treatment with more polysulfide could be made. Or the latex could be washed and then further polymerized by treatment with a current of air. Substantially the same result is obtained finally but the method given is considered the most convenient and economical especially in view of the fact that the excess of polysulfide can be recovered if desired.

It is sometimes advantageous when using the ester-type of organic reactant to substitute all or part of the water used in the reaction by alcohol. This alcohol may be very completely recovered from the spent reaction liquid as the polymer is usually only slightly soluble therein.

In the above example, instead of BB′ dichloroethyl ether, any member selected from the following lists can be employed, using the same molecular proportions.

*Class A.*—Where the carbon atoms (to which the reactive substituents are joined) are attached to and separated by atomic structure characterized by an ether or thio ether linkage. (Esters are included in this class.)

$$X.C_2H_4.O.C_2H_4.X'$$
di-substituted ethyl ether.

$$X.CH_2.O.CH_2.X'$$
di-substituted methyl ether.

$$X.C_2H_4.O.C_2H_4.O.C_2H_4.X'$$
di-substituted ethoxy ethyl ether.

$$X.C_2H_4.S.C_2H_4.X'$$
di-substituted thio ethyl ether.

$$X.CH_2.S.CH_2.X'$$
di-substituted thio methyl ether.

$$X.CH_2O.CH_2.\underset{\underset{CH_3}{|}}{\overset{\overset{CH_3}{|}}{C}}.CH_2.OCH_2.X'$$
di-substituted 1,3 methoxy, 2,2 dimethyl propane.

$$X.CH_2.CH_2.CH_2.O.CH_2.O.CH_2.CH_2.CH_2.X'$$
di-substituted dipropyl formal.

$$X.CH_2.CH_2.O.CH_2.O.CH_2.CH_2.X'$$
di-substituted diethyl formal.

$$X.CH_2O.CH_2.\underset{\underset{X'}{|}}{CH}.OCH_3$$
di-substituted dimethoxy ethane.

di-substituted para diethoxy benzene.

$$X.CH_2O.CH_2.CH_2.OCH_2.X'$$
di-substituted dimethoxy ethane.

$$X.CH_2.CH_2.CH_2.S.CH_2.CH_2.CH_2.X'$$
di-substituted dipropyl thio ether.

$$X.CH_2.CH_2.O.\underset{\underset{O}{\|}}{C}.O.CH_2.CH_2.X'$$
di-substituted diethyl carbonate.

$$X.CH_2.\overset{\overset{O}{\|}}{C}.O.CH_2.CH_2.O.\overset{\overset{O}{\|}}{C}.CH_2.X'$$
di-substituted glycol diacetate.

$$X.CH_2.CH_2.\overset{\overset{O}{\|}}{C}.O.CH_2.CH_2.CH_2.O.\overset{\overset{O}{\|}}{C}.CH_2.CH_2.X'$$
di-substituted trimethylene glycol dipropionate.

*Class B.*—Where the carbon atoms (to which the reactive substituents are joined) are attached to and separated by structure characterized by unsaturated carbon atoms.

$$X.CH_2.CH=CH.CH_2.X'$$
1,4 di-substituted butane 2.

di-substituted 3 tolyl propene 2.

$$X.CH_2.CH=CH.CH_2.CH_2.X'$$
di-substituted pentene 2.

$$X.CH_2.CH=CH.CH_2.CH_2.CH_2.X'$$
1,6 di-substituted hexane 2.

$$X.CH_2.CH_2.CH=CH.CH_2.CH_2.CH_2.X'$$
1,7 di-substituted heptene 3.

$$X.CH_2.CH_2.CH=CH.CH_2.CH_2.X'$$
1,6 di-substituted hexene 3.

$$X.CH_3.CH=CH.\underset{\underset{X'}{|}}{CH}.CH_3$$
1,4 di-substituted pentene 2.

$$X.CH_3.CH_2.CH=CH.\underset{\underset{X'}{|}}{CH_2}.CH_3$$
1,6 di-substituted heptene 3.

*Class C.*—Where the carbon atoms (to which the reactive substituents are joined) are attached to and separated by aromatic structure or an aryl group.

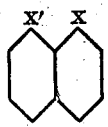
AA' disubstituted naphthalene

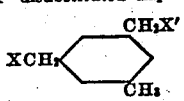
disubstituted mesitylene

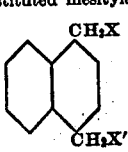
1,4 disubstituted naphthalene

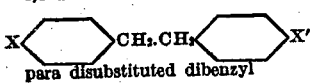
para disubstituted dibenzyl

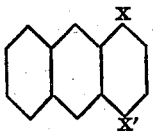
1,4 disubstituted anthracene

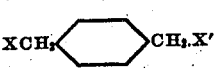
para disubstituted toluene

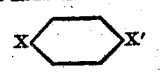
para disubstituted benzene

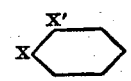
ortho disubstituted benzene

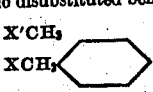
ortho disubstituted xylene

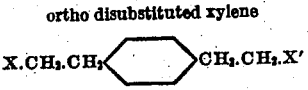
disubstituted para diethyl benzene

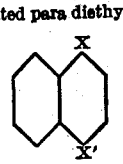
1,4 disubstituted naphthalene

*Class D.*—Where the carbon atoms (to which the reactive substituents are joined) are attached to and separated by structure characterized by saturated carbon atoms or methylene groups.

X.CH₂.CH₂.CH₂.X'

X.CH₂.(CH₂)ₙ.X'

(n may be 1 to 20 or more)

CH₃.CH₂.CH₂.CH₂.CH.CH₂.CH₃
      |           |
      X          X'

X.CH₂.CH.CH₂.X'
      |
    CH₃

X.CH₂.CH.CH₂.X'
      |
    CH₂
      |
    CH₃

EXAMPLE II

*Preparation of a disulfide polymer by oxidation of a polyfunctional mercaptan*

138 pounds or 1 mol of dimercapto ethyl ether, SH.C₂H₄.O.C₂H₄.SH, are dissolved in 100 gallons sodium hydroxide solution containing 90 lbs. of NaOH; that is, an amount of NaOH slightly in excess of 2 mols. With this solution there is intimately mixed a freshly prepared suspension of magnesium hydroxide made by treating 10 pounds of MgCl₂.6H₂O with 2 gallons of water and adding thereto a solution of 4 pounds NaOH dissolved in 0.5 gallon of water. The entire mixture is then placed in a reaction vessel provided with stirring means and also means for heating, for example, steam coils. The mixture is subjected to stirring and to this is gradually added an oxidizing agent in the form of a solution of sodium polysulfide made, for example, by dissolving 348 pounds or 2 mols of sodium tetrasulfide in 1 liter of water during a period of about ten minutes. The reaction occurs approximately at room temperature and is somewhat exothermic. The reaction is substantially completed after all the polysulfide has been added. The completion of the reaction is indicated by withdrawing a sample, acidifying it and observing whether the odor of mercaptan is absent. Stirring may be continued until the reaction is completed as indicated by this test.

The polysulfide acts as an oxidizing agent and converts the dimercapto ethyl ether into a complex polymer or plastic. The advantage of the magnesium hydroxide is that the said polymer or plastic is produced in the form of a latex-like liquid which has the unique property of being capable of intimate mixture with water and settling out subsequently by the action of gravity. This property permits intimate and thorough washing to remove soluble impurities. Acidification of the latex-like liquid causes the separation of polymer as an agglomerated mass, the removal of the impurities from which would be a difficult problem. It is therefore highly desirable to accomplish the washing while this mass is in dispersed form, inasmuch as under such conditions the high degree of dispersion of the polymer permits an extremely thorough removal of the soluble impurities by washing. The difficulty of transporting the latex in agglomerated form, and the ease with which it sticks to parts of apparatus, such as the stirrer, also makes it advisable to produce the polymer in the reaction vessel in its dispersed latex-like form, from which vessel it can be readily removed because of its fluid characteristics. If the polymer were produced in the reaction vessel in its coagulated rubbery form it would be difficult to remove it therefrom and it would be contaminated with the reagents used in its manufacture.

Washing of the polymer in its dispersed condition may be accomplished in the reaction vessel by stirring it up with successive quantities of water, settling and drawing off the supernatant wash liquid. The washing can, of course, be accomplished in a different vessel. In any event, it is desirable to preserve the polymer in its dispersed condition until after removal from the reaction vessel.

The washed latex is then transferred to a second vessel where coagulation or agglomeration is produced by acidification. Sufficient acid may be added for this purpose until the mother liquid is acid to methyl orange or brought to a pH of about 3. The coagulated polymer is then dehydrated by any suitable method, e. g. milling, mastication, or kneading. In such processes, considerable heat is generated which, together with the mechanical action, causes the removal of water.

In the above example, instead of sodium hydroxide as the agent for dissolving the dimercapto compound, other alkaline hydroxides could be used, for example, potassium, ammonium, lithium, calcium, barium, strontium, and in general any other alkaline materials which will not form highly insoluble sulfides.

Instead of magnesium hydroxide, other gelatinous hydroxides may be employed, for example, aluminum hydroxide, chromium hydroxide, ferric hydroxide; moreover, dispersing agents other than hydroxides may be employed, for example, gelatin, albumin, casein, agar, soluble cellulose esters, etc.

Instead of sodium polysulfide, other polysulfides may be employed, e. g. potassium and ammonium polysulfide or any other soluble polysulfide. Other oxidizing agents may be used, for example, oxygen, air, ozone, hypohalites, and in general any oxidizing agent effective in an alkaline solution, for example, hydrogen peroxide, and metallic peroxides, perborates, chromates, dichromates, manganates and permanganates, etc. The reaction is preferably carried on under alkaline conditions because it has been found that the reaction is very favorably influenced by such conditions.

Although in the above example, the step of agglomerating or coagulating the polymer was specifically described, it is in some cases advantageous to preserve the polymer in its dispersed form as such, e. g. for use in coating and impregnating various materials.

In Example IV, instead of dimercapto ethyl ether, any member selected from the list hereinabove set forth can be employed in the same molecular proportions, where X and X' are, respectively, an —SH group, as illustrated in Example IIa.

EXAMPLE IIa 210 grams glycol dimercapto acetate

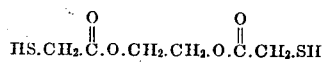

prepared by reacting glycol dichloroacetate with an alcoholic solution of potassium hydrosulfide, are dissolved in two liters of cold molar sodium hydroxide.

25 grams MgCl₂.6H₂O are dissolved in 100 cc. water and 100 cc. of solution containing 15 grams NaOH are mixed with the magnesium chloride solution. The gelatinous mass of Mg(OH)₂ is thoroughly mixed with the mercaptide solution.

The mercaptide is then caused to condense to the latex-like dispersion by treatment as in Example II.

EXAMPLE III

*Reaction of disulphide polymer with elementary sulfur to produce polysulfide polymer*

One mol of the unit of which the polymer is composed (which in Example IV is

—C₂H₄.O.C₂H₄.S.S—)

or, in Example V —CH₂C.O.O.C₂H₄O.O.S.S.S.— is mixed with two atomic weights of sulfur and then heated to about 250° F. for one hour, preferably with the addition of about 0.2 part by weight of diphenylguanidine and 5 parts by weight of zinc oxide. The product obtained is substantially identical with that obtained in Example I as regards its vulcanizing power for and reaction with natural and synthetic rubber, e. g. the butadiene polymers.

In practising the invention, the polysulfide polymer may be mixed with the compound to be vulcanized, e. g. natural rubber, or vulcanizable synthetic rubber, in any suitable manner and the mixture then subjected to a heat treatment to cause reaction to take place. This procedure will be illustrated in the following example:

EXAMPLE IV

| Ingredients or compounds | Parts by weight |
|---|---|
| Polysulfide polymer, as produced in Example I or III | 5 |
| Natural rubber, smoked sheets | 100 |
| Zinc oxide | 5 |
| Carbon black | 45 |
| Pine tar | 3½ |
| Stearic acid | 2 |
| Mercapto benzo thiazole (Captax) | 1 |

The above ingredients were mixed by mastication on a rubber mixing roll and then subjected to a temperature of 274° F. for a period of 90 minutes in a heated mold.

The properties of the resulting cured product will be tabulated below in comparison with those of a product similar in all respects except that elementary sulfur was used as the vulcanizing agent instead of the vulcanizing agent of this invention. The control mixture using elementary sulfur as the vulcanizing agent was made up as follows:

EXAMPLE V

| Ingredients or compounds | Parts by weight |
|---|---|
| Smoked sheets | 100 |
| Zinc oxide | 5 |
| Carbon black | 45 |
| Pine tar | 3½ |
| Stearic acid | 2 |
| Mercapto benzo thiazole (Captax) | 1 |
| Sulfur | 3½ |

This control compound was cured by heating to a temperature of 274° F. for 90 minutes in a heated mold.

The properties of the products produced as in Examples II and III may be contrasted as follows:

| | Pounds per square inch | |
|---|---|---|
| | Example IV | Example V |
| 100% modulus pounds per square inch | 245 | 235 |
| 300% modulus do | 1070 | 1050 |
| Ultimate tensile strength do | 4350 | 3510 |
| Elongation per cent | 670 | 635 |
| Set do | 47 | 40 |
| Hardness | 63 | 63 |

The above comparison shows that, whereas the two moduli given indicate about the same stiffness of the two examples, the tensile strength in the case of Example IV 840 pounds greater, i. e. more than 25% higher, than the control cured in the ordinary manner as in Example V, and the elongation is also greater in the case of Example V.

Experiments covering a considerable period of time have shown conclusively in all cases that in the sulfur cures where a sufficient amount of sulfur was used to effect the optimum cure (as in Example V), a definite blooming of the excess sulfur to the surface sets in in from three to six months, depending somewhat on the conditions under which the specimens are stored, whereas, in no case, even over a period of a year, has any evidence of blooming taken place where the curing agent was of the type set forth in this invention in place of elementary sulfur (e. g. Example IV).

As hereinabove stated, the polysulfide polymer can be obtained by the alkaline polysulfide reaction or by first preparing a disulfide polymer by oxidizing a polyfunctional mercaptan and reacting it with a suitable proportion of sulfur to convert it to a polysulfide polymer, the sulfur so reacting being converted into a labile form. This has been illustrated by Examples I, II and III.

Instead of first preparing an organic polysulfide, by any of the methods above set forth, and employing that as such, as a vulcanizing agent, I may first prepare a disulfide polymer, mix the same with a suitable proportion of elementary sulfur and employ the mixture as a vulcanizing agent. This will be illustrated by the following example:

EXAMPLE VI

*Vulcanizing by means of a disulfide polymer and elementary sulfur*

| | A | B |
|---|---|---|
| Natural rubber (smoked sheets) | 100 | 100 |
| Zinc oxide | 5 | 5 |
| Sulfur | 4 | 4 |
| Disulfide polymer produced as in Example II | None | 5.0 |
| Mercapto benzo thiazole | 1.0 | 1.0 |
| Stearic acid | 1.0 | 1.0 |

The above compounds were cured 50 minutes at 287° F.

| Physical properties | A | B |
|---|---|---|
| Tensile strength lbs. per sq. inch | 3100 | 3980 |
| Elongation at break per cent | 800 | 890 |

When examined at the end of six months, sample A had bloomed considerably and incipient checking was evident when the sample was stretched.

Example B showed no trace of bloom nor did it exhibit any trace of light checking on flexure or stretch.

Physical tests after 6 months aging.

|  | A | B |
|---|---|---|
| Tensile strength_____lbs. per sq. inch__ | 2280 | 3850 |
| Elongation at break_____per cent__ | 730 | 840 |

It will thus be apparent that freedom from blooming is not the only advantage gained by practising the present invention and that new compositions having other improved properties, are obtained.

Various synthetic rubbers, such as those produced by polymerization of butadiene, chloroprene (chloro 2, butadiene 1,3) etc. may be cured or vulcanized by elementary sulfur, but such vulcanizates tend to bloom very badly upon standing or storage. The present invention makes it possible to effect curing of these synthetic rubbers without the blooming disadvantage. The application of my invention in this respect will be illustrated by the following examples:

The synthetic rubber used in Example VII, C and D, was the rubber-like plastic derived from polymerization of 2-chloro, 1-3 butadiene, and will be referred to as chlor-butadiene.

That used in Example VIII, E and F, was a rubber-like plastic derived from the polymerization of butadiene in the presence of a metallic sodium catalyst.

EXAMPLE VII

|  | C | D |
|---|---|---|
| Chlor butadiene_____ | 100.0 | 100.0 |
| Sulfur_____ | 3.0 | None |
| Tetrasulfide polymer produced as in Examples I and III | None | 5.0 |
| Light calcined magnesia_____ | 10.0 | 10.0 |
| Cottonseed oil_____ | 10.0 | 10.0 |
| Carbon black_____ | 35.0 | 35.0 |
| Zinc Oxide_____ | 10.0 | 10.0 |

Cure 40 minutes at 307° F.

| Physical tests | C | D |
|---|---|---|
| Modulus at 300% elongation_____ | 400 | 515 |
| Tensile strength_____lbs. per sq. in__ | 2700 | 3110 |
| Elongation at break_____per cent__ | 870 | 900 |

The use of the tetrasulfide polymer (in this example the tetrasulfide derivative of ethyl ether was used), gave a vulcanizate having definitely enhanced physical properties. Moreover, when the stocks were examined after six months aging, the sulfur core showed a definite crystalline bloom, whereas D had a polished black surface apparently entirely unchanged.

EXAMPLE VIII

|  | E | F |
|---|---|---|
| Butadiene polymer_____ | 100.0 | 100.0 |
| Sulfur_____ | 5.0 | None |
| Tetrasulfide polymer produced as in Examples I and III | None | 5.0 |
| Cottonseed oil_____ | 10.0 | 10.0 |
| Pine tar_____ | 5.0 | 5.0 |
| Carbon black_____ | 40.0 | 40.0 |
| Zinc oxide_____ | 10.0 | 10.0 |

Cure 40 minutes at 307° F.

| Physical tests | E | F |
|---|---|---|
| Tensile strength_____lbs. per sq. in__ | 2110 | 2360 |
| Elongation at break_____per cent__ | 550 | 590 |

Examination at the end of a six months period showed E to have a powdery bloom on the surface from which F was entirely free.

In Examples VII and VIII, a mixture of 1 to 4 atomic weights of sulfur with a mol of the polymer of the unit $$\left[ -\overset{|}{\underset{|}{C}} \ldots \overset{|}{\underset{|}{C}}.S.S. \right]$$

could be used instead of the tetrasulfide polymer specifically mentioned in said examples, the carbon atoms of that unit being joined to and separated by suitable structure as described.

It is of great advantage to be able to vary the rate of vulcanization independently of the per cent of sulfur combined or coefficient of vulcanization. The ideal condition is to have a vulcanizing agent which itself possesses no accelerating action and to obtain the desired coefficient by regulating (1) the time, (2) temperature and (3) nature and concentration of accelerator, (1), (2) and (3) being capable of variation independently of the vulcanizing agent. The vulcanizing agents of this invention very closely approach this ideal. This means that if the time and temperature are fixed, the coefficient of vulcanization can be controlled solely by controlling the nature and concentration of accelerator in the presence of a predetermined or fixed concentration of vulcanizing agent. Independence of control as between coefficient of vulcanization and rate of cure is desired in order to attain for example a high rate of cure, or a low rate of cure for the same extent or coefficient of vulcanization. Conversely, different coefficients of vulcanization may be necessary for the same rate of cure. This independence of control is provided by the present invention.

For example, in a composite rubber article, such as a tire casing, to obtain the necessary variation in properties of the respective components, it is necessary to control the rate of curing independently of the coefficient of vulcanization. This cannot be done if the vulcanizing agent possesses active accelerating ability and if this ability is in a fixed ratio to its combining power for the rubber.

To some extent sulfur possesses this vulcanizing power independent of accelerating effect but combination of sulfur and accelerator have at least two marked disadvantages. First, they are subject to the phenomenon of "reversion" according to which the elongation and tensile strength reach a maximum and then decrease so that great care must be taken not to pass this maximum. Frequently this maximum cannot be attained as for example in composite articles which must be cured at the same temperature and for the same period, where the component parts have different rates of cure.

On the contrary, combinations of the vulcanizing agent of this invention with accelerators are free from the phenomenon of reversion. Consequently tensile strength and elongation do not decrease after reaching a maximum.

In support of the above statements, regarding independence between rate of vulcanization and coefficient, and freedom from reversion, the following data are submitted:

EXAMPLE IX

|  | A | B |
|---|---|---|
| Smoked sheets | 100.0 | 100.0 |
| Tetrasulfide polymer | 7.5 | 7.5 |
| Zinc oxide | 5.0 | 5.0 |
| Stearic acid | 1.0 | 1.0 |
| Mercapto benzo thiazole |  | 1.0 |

The above products A and B were then cured and the cured products tested as shown below:

| Cure | | Modulus 500% | Tensile | Elongation | Sample |
|---|---|---|---|---|---|
| Min. | Temp. | | | | |
| | °F. | | | | |
| 30 | 287 | 330 lbs. | 3000 | 850 | B |
| 60 | 287 | 450 lbs. | 3110 | 810 | B |
| 90 | 287 | 470 lbs. | 3000 | 790 | B |
| 120 | 287 | 490 lbs. | 2980 | 780 | B |
| 120 | 298 | No cure | | | A |
| 180 | 298 | 20 | 125 | 930 | A |
| 240 | 298 | 30 | 200 | 940 | A |

The above data show conclusively that the ether tetrasulfide polymer did not have an accelerating effect and therefore can be used in suitable proportions in a sulfurless cure for which any suitable degree of acceleration may be selected.

Tests in product A in which no accelerator is used show that the vulcanizing agent of this invention in the presence of an accelerator produces tensile strength of 3,000 pounds per square inch in 30 minutes at 287° F. (indicating rapid cure) whereas in the absence of an accelerator only 200 pounds per square inch was obtained in 4 hours at 298° F. (indicating substantially no cure). Therefore, with the vulcanizing agent of this invention, the rate of cure can be controlled at will by selecting the kind and concentration of accelerator. By using greater or smaller proportions of accelerator than that shown in Example IX, or by using accelerators more or less powerful than that shown in Example IX, higher or lower rates of cure could be obtained.

In Example IX, B, the coefficient obtained was about 3 per cent. This was obtained in 30 minutes by one per cent of mercapto benzo thiazole. The same coefficient is obtained in 70 minutes at the same temperature by 0.25 per cent, demonstrating further that the rate of cure can be varied independently of the coefficient.

Referring again to the above curing data, it will be noted that the maximum strength was obtained in 30 minutes. This strength was not decreased (within experimental error) by continuing the cure to a period of 120 minutes.

Moreover, when sulfur is used, an excess is required over that which combines and this excess brings in its train a number of disadvantages, e. g. blooming, poor aging qualities in air and sunlight and especially at somewhat elevated temperatures.

In contrast to this, the vulcanizing agents of this invention yield substantially no free sulfur. Observations on compounds (vulcanized according to this invention) over a period of more than a year have shown no evidence of sulfur bloom.

In addition to the desirable qualities above mentioned, the vulcanizing agents of this invention possess vulcanizing power independent of accelerating effect, this independence being even more marked than in the case of sulfur.

This permits the selection and use of any suitable degree of acceleration by selecting a particular accelerator and using it, in controlled concentration, in conjunction with the vulcanizing agents of this invention.

Among these accelerators the following may be mentioned:

Benzothiazyl disulfide
Mercaptobenzo thiazole
Diphenyl guanidine
Tetramethyl thiuram disulfide
Di-orthotolyl guanidine
Ethylidene aniline

I claim:

1. A vulcanizable composition comprising a vulcanizable rubber and an organic polymer of the unit

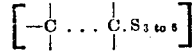

where

represents two carbon atoms joined to and separated by intervening structure and S is a sulphur atom, the said polymer containing combined sulphur available for causing vulcanization of the rubber and the proportion of said polymer to the rubber being from about 5 to 7.5 parts by weight of polymer and 100 parts by weight of rubber.

2. A vulcanized rubber composition comprising the reaction product of a vulcanizable rubber and an organic polymer of the unit

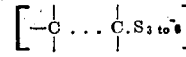

where

represents two carbon atoms joined to and separated by intervening structure, the proportion of said polymer being from about 5 to 7.5 parts by weight of polymer to 100 parts by weight of rubber.

3. The process which comprises incorporating with a vulcanizable rubber an organic polymer of the unit

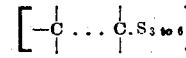

where

represents two carbon atoms joined to and separated by intervening structure and S is a sulphur atom, together with a predetermined proportion of a substance which accelerates the vulcanization of rubber by sulphur, the proportion of said polymer to rubber being from about 5 to 7.5 parts by weight of polymer to 100 parts by weight of rubber and effecting vulcanization by heating the compound.

JOSEPH C. PATRICK.